United States Patent [19]

Dekko

[11] Patent Number: 4,741,432
[45] Date of Patent: May 3, 1988

[54] CONVEYOR BELT

[75] Inventor: Chester E. Dekko, Kendallville, Ind.

[73] Assignee: Lyall Electric, Inc., Kendallville, Ind.

[21] Appl. No.: 888,223

[22] Filed: Jul. 23, 1986

[51] Int. Cl.[4] ............... B65G 15/58; B65G 23/02; F16H 7/02
[52] U.S. Cl. ............... 198/803.8; 198/834; 140/1; 474/153; 474/204
[58] Field of Search ............ 198/834, 803.8; 474/153, 204, 184, 185, 186; 140/1, 2

[56] References Cited

U.S. PATENT DOCUMENTS

| 2,430,720 | 11/1947 | Kline et al. | 198/834 |
|---|---|---|---|
| 2,551,578 | 5/1951 | Bendall | 474/153 |
| 2,652,791 | 9/1953 | Liston | 198/835 |
| 3,120,892 | 2/1964 | Henning et al. | 198/803.8 |
| 3,513,963 | 5/1970 | Witte | 198/803.8 |
| 3,773,166 | 11/1973 | Nowacki | 198/835 |
| 3,841,472 | 10/1974 | Fuller et al. | 198/803.8 |
| 3,860,107 | 1/1975 | Cioni et al. | 198/803.14 |
| 4,361,173 | 11/1982 | Storimans | 198/803.8 |
| 4,411,181 | 10/1983 | Imai | 140/1 |

Primary Examiner—Stephen J. Novosad
Assistant Examiner—Bruce M. Kisliuk
Attorney, Agent, or Firm—Roger M. Rickert

[57] ABSTRACT

A wire processing system wherein lengths of insulated wire are sequentially presented to processing stations for insulation stripping and subsequent terminal crimping, is disclosed employing an improved wire gripping and transporting arrangement having a flexible conveyor belt with a plurality of wire keepers molded to and distributed about the belt, each keeper including a pair of upstanding resilient projections having a gap therebetween to receive and grip a section of wire, an input station where wire is pushed into the gap between projection pairs, and an output station including a picker to be positioned adjacent the projection pair between the wire and the belt with relative motion between the picker and the keeper ejecting the wire from the gap. The belt is entrained on a drive wheel having a plurality of generally flat peripheral surfaces, and on an idler wheel. Each keeper has an inner face including a pair of generally orthogonal ridges, one ridge for maintaining lateral alignment of the belt on the drive wheel and the other ridge for tractively moving the belt as it passes over the drive wheel. The drive wheel flat surfaces each include a pair of generally orthogonal grooves, one extending longitudinally in the direction of wheel movement for receiving one keeper ridge to maintain lateral alignment of the belt on the wheel, and the other extending transversely for receiving the other keeper ridge to engage and pull the belt.

24 Claims, 3 Drawing Sheets

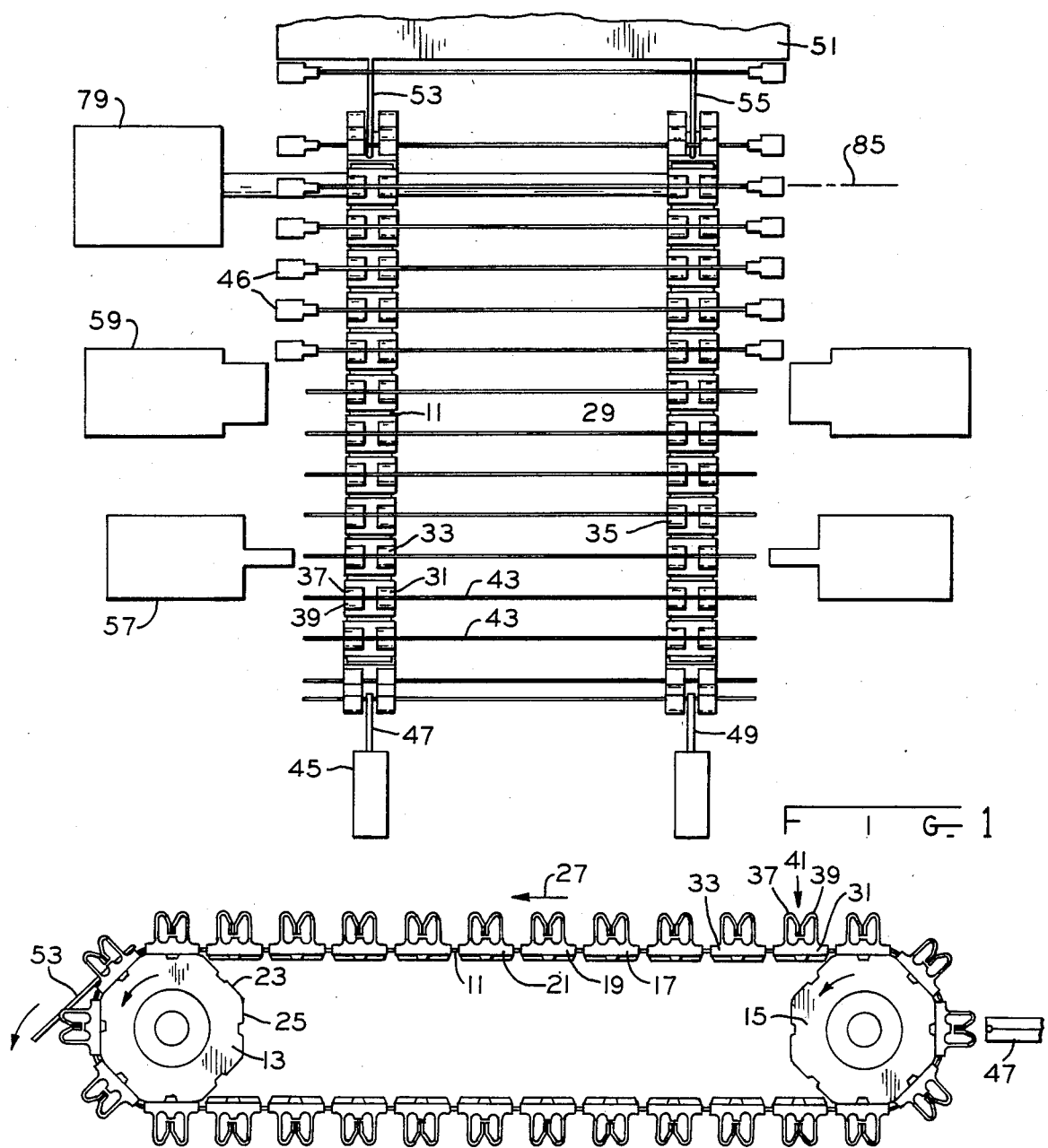

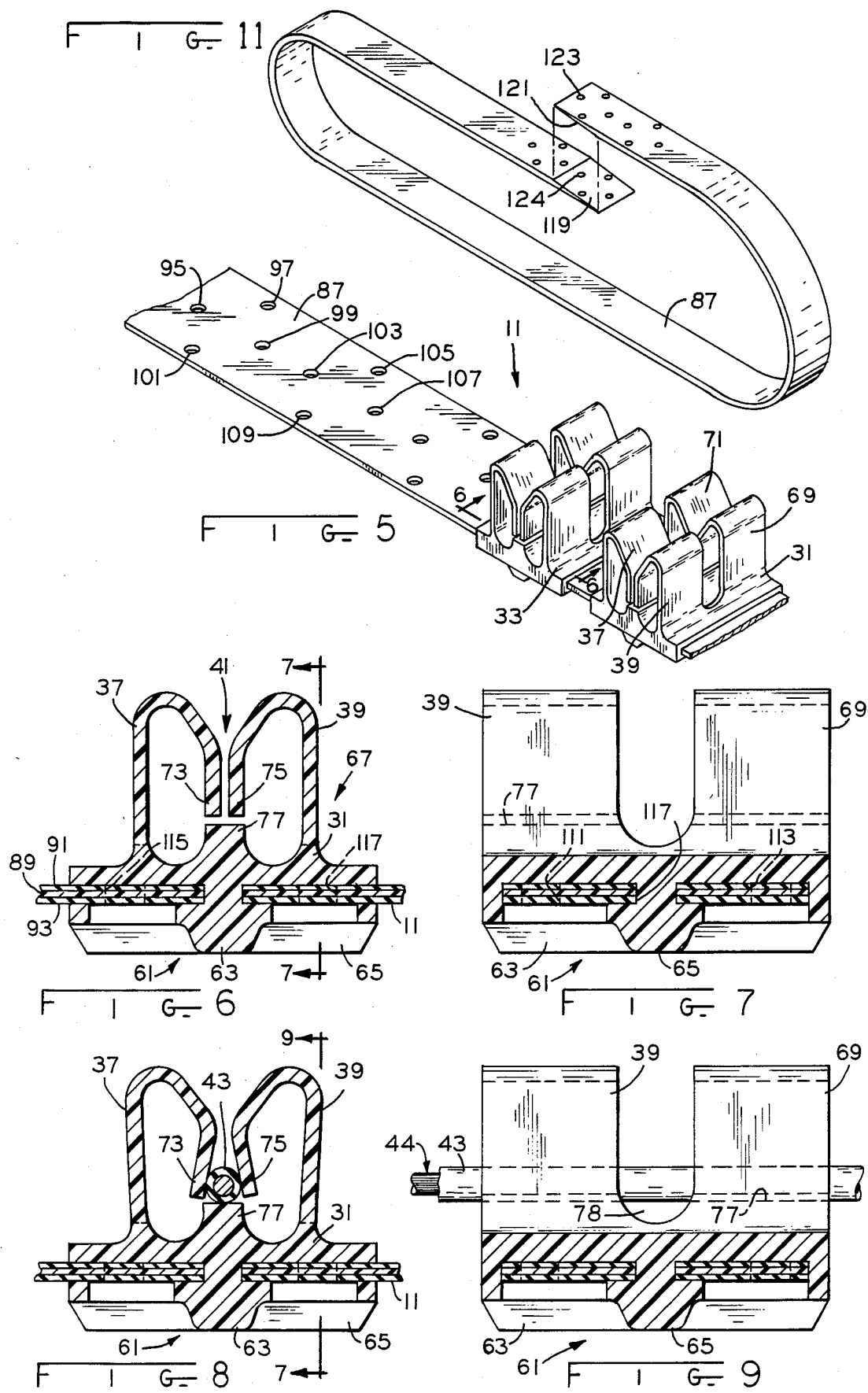

CONVEYOR BELT

SUMMARY OF THE INVENTION

The present invention relates generally to conveyor systems and more particularly to an improved flexible conveyor belt. In a particular disclosed preferred embodiment, the present invention incorporates an improved flexible conveyor belt into a wire processing system.

The conveyor art generally is old and well established as is the more specific art of power driven conveyor belts or chains, some of which include component gripping devices on the belt or chain.

In the exemplary wire processing art, one or more articulated chains similar to, but larger than, a conventional bicycle chain are entrained on sprockets at least one of which is power driven. The chain in turn supports a number of so called "keepers." Each keeper is usually a metallic clamp arrangement for gripping the wire to be processed and spring loaded toward a closed or wire gripping position. At input and output stations, the keepers are moved against the normal spring bias to receive or eject a piece of wire. Wire processing stations such as for stripping insulation and crimping terminals are located intermediate the input and output stations. To completely process a piece of wire, the entire assembly including chains, the several keepers, the sprocket wheels, and the remainder of the drive train as well as the several wires supported by the keepers must be repeatedly started, moved to present each wire to the next successive processing station and stopped. This repeated acceleration of a relatively large mass is quite inefficient in terms of power consumption as well as the time required to move the components between successive stations. Such equipment is also quite noisy in operation and expensive to initially install and to maintain.

In addition to the common conveyor belt which provides a continuously moving horizontal surface, a number of special purpose continuous conveying arrangements have been suggested including a cog wheel driven belt supporting a conveyor surface (U.S. Pat. No. 3,967,721); a flexible belt supporting and separating bottles through a filling operation (U.S. Pat. No. 3,513,963); and modification of a pair of conventional toothed belts (timing belts) to convey components to a marking device (U.S. Pat. No. 4,494,456). Such arrangements are either not suited to wire processing as described above or not suited to intermittent (start and stop) conveying processes, and are frequently not adaptable to either.

Among the several objects of the present invention may be noted the provision of an improved keeper for holding a piece of wire during a wire processing operation; the provision of a conveyor system having reduced lubrication requirements; the overall reduction in noise level associated with the operation of a conveyor system; the provision of an improved wire gripping and transporting arrangement; the provision of an improved wire keeper of reduced size and weight thereby allowing closer wire spacing along a conveyor, requiring less energy to operate as well as allowing reduced strength components in the conveyor drive train; and significant reduction in the inertia associated with a wire processing operation. These as well as other objects and advantageous features of the present invention will be in part apparent and in part pointed out hereinafter.

In general, a conveyor system of the type having a flexible endless belt entrained on at least a driving wheel and an idler wheel has at least the driving wheel periphery of a generally regular polygonal configuration having a plurality of generally flat faces and the endless belt includes a plurality of uniformly spaced apart relatively inflexible key segments each having an inner face conforming to the contour of one face of the polygonal driving wheel and an outer face adapted to releaseably receive components to be conveyed thereby.

Also in general, a conveyor system has a conveyor belt comprising an endless flat flexible band of inelastic material and a plurality of uniformly spaced apart component receiving keepers each formed as a one piece member completely encircling the band; and a drive wheel for transmitting motion to the conveyor belt, the wheel being rotatable about a central axis and having periodic chordal generally flat surfaces about its periphery for drivingly engaging keepers distributed along the belt.

Still further in general, and in one form of the invention, an endless conveyor belt is fabricated by providing an elongated flat flexible strip and perforating the flexible strip to create uniformly spaced sets of holes through the strip along the length thereof and then joining free strip ends to form an endless band of a preferred length which maintains the uniform hole spacing across the junction of the free ends. The perforating may be performed after joining the free strip ends if the band length is calculated keeping the hole spacing in mind. Thereafter, injection molding of plastic members to completely encircle the band in selected regions with plastic of each of the members passing through at least one of the band holes insures proper positioning of the plastic members.

BRIEF DESCRIPTION OF THE DRAWING

FIG. 1 is a plan view illustrating, somewhat schematically, a wire processing system incorporating the conveyor belt of the present invention;

FIG. 2 is a side elevation view of the conveyor portion of the system of FIG. 1;

FIG. 3 is a side view of a drive wheel suitable for use in the system of FIGS. 1 and 2;

FIG. 4 is an end view of the drive wheel of FIG. 3;

FIG. 5 is a perspective view of a segment of a partly assembled conveyor belt of the type illustrated in FIGS. 1 and 2;

FIG. 6 is a view in cross-section along line 6—6 of FIG. 5;

FIG. 7 is a view in cross-section along line 7—7 of FIG. 6;

FIG. 8 is a view similar to FIG. 6 but illustrating a section of wire captive in a keeper;

FIG. 9 is a view similar to FIG. 7 but along line 9—9 of FIG. 8;

FIG. 11 is a perspective illustration of one scheme of splicing a strip of material to form an endless band of a preferred length.

Corresponding reference characters indicate corresponding parts throughout the several views of the drawing.

Figure 10:
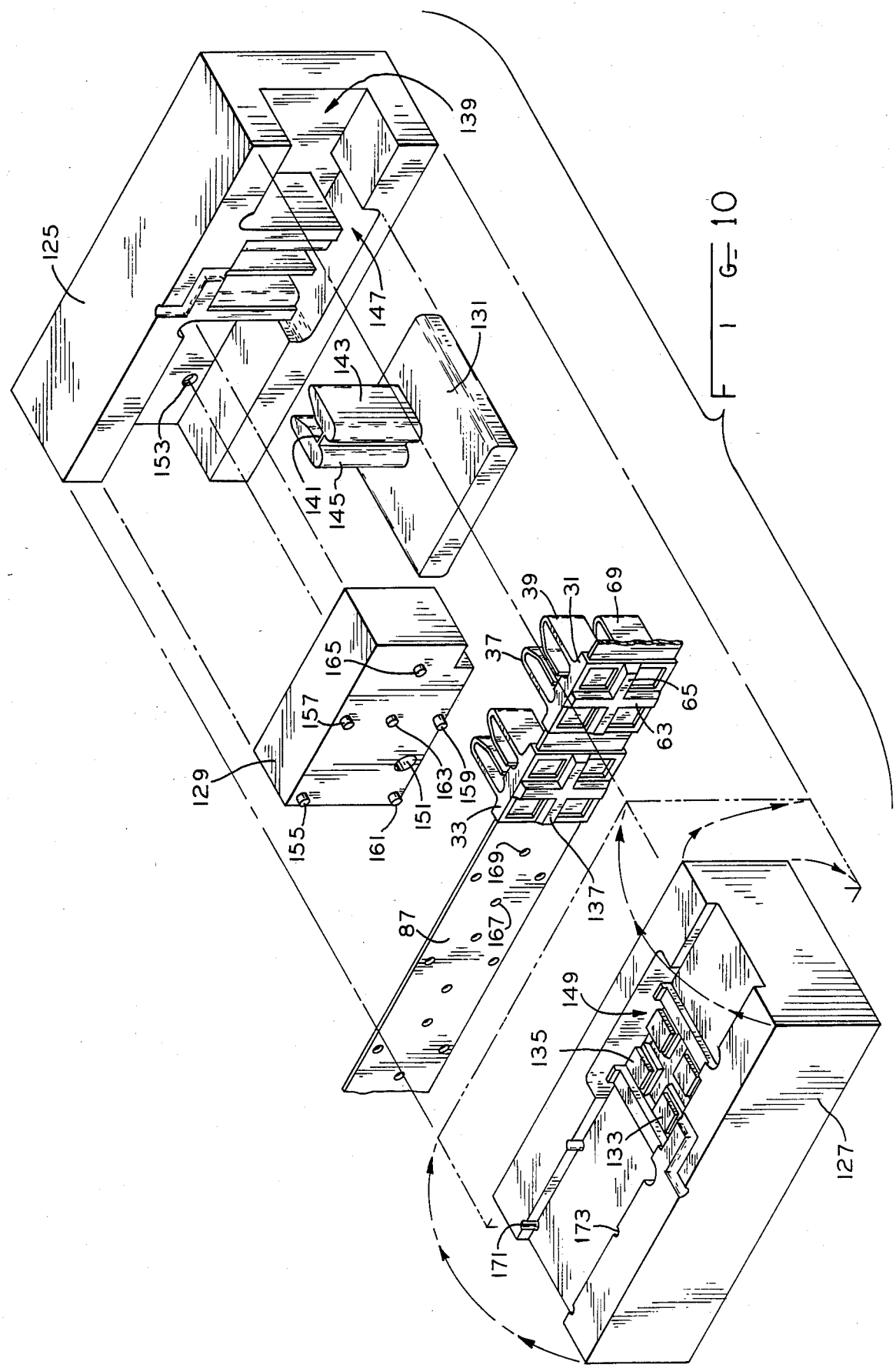
FIG. 10 is an exploded perspective view showing the relationship of the belt segment of FIG. 5 and the mold forming a keeper thereon.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring first to FIGS. 1 and 2, there is illustrated a conveyor system of the type having a flexible endless belt 11 entrained on a driving wheel 13 and an idler wheel 15. The endless belt includes a plurality of relatively inflexible key segments 17, 19 and 21 uniformly spaced apart about the belt. The driving wheel periphery, and preferably also the idler wheel periphery, has a plurality of generally flat faces 23 and 25 which conform to corresponding inner faces of the key segments. While the key segments are relatively inflexible, there is sufficient gap between adjacent segments to allow the belt portion between segments to freely flex allowing the belt to conform to the wheels 13 and 15. Thus, when wheel 13 is caused to rotate as illustrated by the arrow, flat faces such as 23 engage corresponding inner key segment faces causing belt 11 to move in the direction of arrow 27.

In the wire processing system illustrated in FIG. 1, an improved wire gripping and transporting arrangement includes two flexible conveyor belts 11 and 29 each having a plurality of wire keepers such as 31, 33, and 35 molded to and distributed uniformly about the belt. Each keeper includes a pair of upstanding resilient projections 37 and 39 spaced and aligned to form a gap 41 (FIGS. 2 and 6) therebetween to receive and grip therebetween a section of wire 43. At one end of the system there is an input station 45 where wire is pushed into the gap between projection pairs by a pair of push rods 47 and 49. At the opposite end there is an output station 51 including pickers 53 and 55, each to be positioned adjacent the projection pair between the wire and the belt with relative motion between the picker and the keeper ejecting the wire from the gap. Intermediate the input station 45 and the output station 51 there is illustrated a sequence of processing stations such as a wire insulation stripping station 57 where insulation is removed as illustrated at 44 in FIG. 9 and a terminal applying or crimping station 59 where conventional connectors or terminals 46 are applied. As depicted, both ends of a piece of wire such as 43 are similarly processed at each station simultaneously, but one end only or dissimilar processing steps are of course, possible.

Referring now to FIGS. 6, 7 and 10, each key segment has an inner face 61 with a pair of orthogonally extending ridges 63 and 65 which function, in conjunction with the drive wheel face pattern best seen in FIGS. 3 and 4, to maintain lateral alignment of the belt on the wheel and to pull the belt as it passes over the wheel. The opposite or outer face 67 includes the projections 37 and 39 for releaseably receiving components such as wire section 43 for conveyance by the system.

The one piece injection molded plastic members which are uniformly distributed along the band 11 have been referred to as keepers 31 or as key segments 21 with the distinction between the two terms being merely one of emphasis. While it is possible and within the scope of the invention to intersperse dissimilar pieces along the belt, as illustrated and described herein, the same piece performs both the keeper function of gripping a component to be conveyed and the key or lug function of traction and alignment on the sheaves or wheels 13 and 15.

The details of the component gripping function are perhaps best described by comparing FIGS. 6 and 7 to FIGS. 8 and 9. Each keeper such as 31 includes four flexible projections 37, 39, 69 and 71 each of a generally "U" shape having one leg or end integral with and extending from the body of the keeper, and more specifically, from face 67, while the opposite "U" end is free. These projections are in pairwise alignment both longitudinally (in the direction of belt motion), for example, projections 37 and 39 are longitudinally aligned, and transversely (orthogonal or perpendicular to belt motion), for example, projections 39 and 69 are transversely aligned. The "U" free ends such as 73 and 75 face one another so that as a length of insulated wire 43 is forced into the gap 41, a resilient separating of the free ends 73 and 75 occurs and the "U" closes somewhat. Movement of the wire 43 past the free ends 73 and 75 is prevented by a transverse projection 77 so that the wire 43 assumes generally the location illustrated in FIG. 9 and the picker 53 has access to dislodge the wire through the gap or opening 78.

At least one of the wheels 13 and 15 is power driven, for example, by drive motor 79 to rotate about its central axis 85 and traction between the driving wheel and the conveyor belt is provided by the conforming or mating of the lug inner faces 61 and the generally flat faces such as 23 and 25 of the drive wheel. As best seen in FIG. 4, each wheel face includes a transverse notch or groove 81 for receiving a corresponding transverse ridge or boss 63 in meshing relationship to provide tractive power for driving the conveyor belt in somewhat the same manner as a conventional timing belt is driven. Each wheel face also includes a longitudinal groove 83 for receiving a longitudinal ridge or boss such as 65. This intermeshing serves to keep the belt properly aligned on the wheel and prevents lateral movement of the belt relative to the wheel.

The drive wheel 13 as viewed in FIG. 3 is essentially an octagonal sheave or pulley differing from conventional pulleys or sprockets by having periodic chordal flat surfaces 23 and 25 about its periphery with traction and alignment grooves in each flat face. Each flat face is configured to mate with a corresponding relatively inflexible plastic segment on the inner surface of the belt, i.e., the inner face of a component receiving keeper 31.

The details of the conveyor belt are best explained in conjunction with FIGS. 5, 6, 7 and 10. The belt includes an endless flat flexible band 87 of reinforced fabric. The band should be relatively inelastic so as to resist stretching in the direction of conveyor movement. A strip material having a central layer 89 of Nylon reinforced rubber-like material with outer layers 91 and 93 of a Nylon fabric laminated to the opposed surfaces of layer 89 about one inch wide and one-sixteenth inch thick has been found suitable.

The exemplary keeper 31 is seen to comprise a one piece plastic member completely encircling the band 87 formed, for example, from a polypropylene material injection molded directly onto the band. Frequently, the belt surface is sufficiently rough to insure that the keepers will not slide or move on the band, however, to securely anchor the keepers in place and aid in proper keeper spacing, sets of uniformly spaced holes or apertures have been prepunched in the band. Holes 95, 97, 99 and 101 form one set while holes 103, 105, 107 and 109 form an adjacent set. When the keeper is injection molded on the band, keeper plastic material extends through these sets of holes as at 111 and 113 in FIG. 7 and 115 and 117 in FIG. 6 to join with the ridges 63 and 65 on the keeper inner face.

The traction lug and component grippers may be injection molded directly onto the band 87 one at a time in the manner illustrated in FIG. 10. Preparatory to molding, the abovementioned holes are punched and free belt ends joined to form an endless loop. If the ends are joined prior to punching, care must be taken to ensure that the belt length is an integral multiple of the keeper spacing. On the other hand, the holes may be punched and then ends joined to the proper length based on the hole separation. This latter option is illustrated in FIG. 11 wherein the prepunched band has its free ends shaved or tapered at 119 and 121 and those tapered sections are adhesively joined with the holes such as 123 and 124 superimposed to ensure proper belt length and therefore proper keeper spacing. The splice strength may be enhanced by subsequent molding of a keeper over the joint.

FIG. 10 illustrates a separable pair of mold cavity halves 125 and 127 with cavity 125 shaped to form the outer surfaces of the flexible projections while cavity 127 is shaped to form the ridges on the inner face of the keeper. Proper keeper spacing is maintained by the alignment pin insert 129 which spaces the keeper being molded accurately from the holes for the next to be formed keeper. The inner surfaces of the "U" shaped flexible projections is formed by the mold insert 131. To mold the final keeper on the belt, alignment pin insert 129 is removed to make room for the already formed adjacent keeper. A more complex mold for forming several or all keepers simultaneously is, of course, possible.

In particular, the stepped projections such as 133 and 135 form therebetween a portion of the ridges or boss such as 137 of keeper 33. Keeper 31 nests in relieved region 139 while keeper 33 is being molded. A blade 141 spans the gap between the two "U" interior forming projections 143 and 145 to create the gap between the free ends 73 and 75, and the transverse projection 77 (FIGS. 6 and 8). The mold insert 131 slides into recesses 147 and 149 in the mold halves 125 and 127 respectively when the halves are joined preparatory to injection molding keeper 33. A cap screw (not shown) passes through the recessed hole 151 of insert 129 and into threaded hole 153 of mold half 125 holding insert 129 in place until its removal is required to make room for already formed keepers to either side of the last few keepers to be formed on the band 87. Pins 155, 157, 159 and 161 help align the mold halves by mating with holes such as 171 and 173 while also helping to maintain lateral positioning of band 87 in the mold. Pins 163 and 165 mate with band holes 167 and 169 to assure proper longitudinal positioning of and separation between keepers on the belt.

As noted earlier, conventional wire processing technology dictates a chain with spring loaded wire keepers which is noisy, requires frequent lubrication, and requires a relatively massive drive mechanism in addition to a massive chain mechanism to effect intermittent movement of the wire segments to be processed. An exemplary conveyor belt of eighteen foot circumference according to the present invention weighs about two and one-quarter pounds which is on the order of 1% or 2% of the mass of the chain drive it replaces, thus, energy requirements are significantly reduced and the drive and idler wheels, cams, gears, and other drive train components may be fabricated of self lubricating plastic materials still further reducing the mass to be moved and the noise levels associated with operation. The keepers of the present invention are smaller than prior art arrangements and may be located more closely adjacent one another thereby reducing the distance and time required to move a wire from one station to the next. Repair of a broken keeper, should that ever be necessary, is facilitated by simply molding a new keeper to the belt or by providing repair keepers to be staked or rivited to the belt.

From the forgoing, it is now apparent that a novel arrangement has been disclosed meeting the objects and and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In a conveyor system of the type having a flexible endless belt entrained on at least a driving wheel and an idler wheel, the improvement wherein the driving wheel periphery is of a generally regular polygonal configuration having a plurality of generally flat faces and the endless belt includes a plurality of uniformly spaced apart relatively inflexible key segments each having an inner face conforming to the contour of one face of the polygonal driving wheel and an outer face adapted to releaseably receive components to be conveyor thereby, each key segment inner face including a pair of generally orthogonal ridges, one ridge for maintaining lateral alignment of the belt on the driving wheel and the other ridge for tractively moving the belt as it passes over the driving wheel.

2. The improvement of claim 1 wherein each driving wheel flat face includes a pair of generally orthogonal grooves, one extending longitudinally in the direction of wheel movement for maintaining lateral alignment of the belt on the wheel, and the other extending transversely for engaging respective key segment ridges and pulling the belt.

3. The improvement of claim 1 wherein each key segment is a one piece injection molded member.

4. The improvement of claim 1 wherein each driving wheel flat face includes a pair of generally orthogonal grooves, one extending longitudinally in the direction of wheel movement for maintaining lateral alignment of the belt on the wheel, and the other extending transversely for engaging and pulling the belt.

5. A drive wheel for transmitting motion to a flexible belt, the wheel being rotatable about a central axis and having periodic chordal generally flat surfaces about its periphery for drivingly engaging relatively inflexible segments distributed along the belt, each generally flat surface including a pair of generally orthogonal grooves, one extending longitudinally in the direction of wheel movement for maintaining lateral alignment of the belt on the wheel, and the other extending transversely for engaging and pulling the belt.

6. A conveyor belt comprising an endless flat flexible band of reinforced fabric and a plurality of uniformly spaced apart component receiving keepers each formed as a one piece member completely encircling the band.

7. The conveyor belt of claim 6 wherein each keeper is an injection molded one piece plastic member injection molded directly onto the band.

8. The conveyor belt of claim 7 wherein the band has at least one prepunched aperture in the region of each keeper, keeper plastic extending through the at least one aperture to anchor the keeper in place along the band.

9. The conveyor belt of claim 8 wherein each keeper has an inner face including a pair of generally orthogonal ridges.

10. The conveyor belt of claim 9 wherein there are four prepunched apertures in the region of each keeper adjacent the ridges with plastic extending from the ridges and through the apertures.

11. A one piece traction lug and component gripper for a conveyor system comprising a conveyor drive wheel engaging surfaces having at least one drive wheel engaging boss protruding therefrom and four flexible projections extending from the piece in a direction opposite the boss and in spaced aligned relationship for resiliently gripping a component placed therebetween, each of the four flexible projections being of a generally "U" shape with one "U" end integral with the piece and the other "U" end free.

12. The one piece traction lug and component gripper of claim 11 wherein the component comprises a length of insulated wire to be provided with a terminal on one end as it moves along the conveyor system, the projections being in pairwise alignment longitudinally and transversely with "U" free ends facing one another, the wire being accepted and gripped by a resilient separating of adjacent "U" free ends and a correlative closing of each "U".

13. The one piece traction lug and component gripper of claim 12 wherein the length of wire may be removed subsequent to application of a terminal thereto by introduction of a picker between laterally adjacent projection pairs and between the wire and the drive wheel engaging surface to dislodge the wire.

14. The one piece traction lug and component gripper of claim 12 further comprising a further transverse projection adjacent each "U" free end for preventing movement of the wire past the "U" free ends.

15. In a conveyor system, a conveyor belt comprising an endless flat flexible band of inelastic material and a plurality of uniformly spaced apart component receiving keepers each formed as a one piece member completely encircling the band; and a drive wheel for transmitting motion to the conveyor belt, the wheel being rotatable about a central axis and having periodic chordal generally flat surfaces about its periphery for drivingly engaging keepers distributed along the belt.

16. The combination of claim 15 wherein each keeper has an inner face including a pair of generally orthogonal ridges, one ridge for maintaining lateral alignment of the belt on the drive wheel and the other ridge for tractively moving the belt as it passes over the drive wheel, the drive wheel flat surfaces each including a pair of generally orthogonal grooves, one extending longitudinally in the direction of wheel movement for receiving one keeper ridge to maintain lateral alignment of the belt of the wheel, and the other extending transversely for receiving the other keeper ridge to engage and pull the belt.

17. The combination of claim 16 wherein each keeper is an injection molded one piece plastic member injection molded directly onto the band.

18. The combination of claim 17 wherein the band has at least one prepunched aperture in the region of each keeper, keeper plastic extending through the at least one aperture to anchor the keeper in place along the band.

19. The combination of claim 15 wherein the conveyor system is a wire processing system with lengths of insulated wire to be provided with terminals as they move along the conveyor system, each keeper having an outer face with flexible projections extending therefrom for gripping therebetween a length of wire.

20. In a wire processing system wherein lengths of insulated wire are sequentially presented to processing stations for insulation stripping and subsequent terminal crimping, an improved wire gripping and transporting arrangement comprising a flexible conveyor belt having a plurality of wire keepers molded to and distributed about the belt, each keeper including a pair of upstanding resilient projections having a gap therebetween to receive and grip therebetween a section of wire, an input station where wire is pushed into the gap between projection pairs, and an output station including a picker to be positioned adjacent the projection pair between the wire and the belt with relative motion between the picker and the keeper ejecting the wire from the gap.

21. The combination of claim 20 wherein the belt is entrained on a drive wheel having a plurality of generally flat peripheral surfaces, and on an idler wheel, each keeper having an inner face including a pair of generally orthogonal ridges, one ridge for maintaining lateral alignment of the belt on the drive wheel and the other ridge for tractively moving the belt as it passes over the drive wheel, the drive wheel flat surfaces each including a pair of generally orthogonal grooves, one extending longitudinally in the direction of wheel movement for receiving one keeper ridge to maintain lateral alignment of the belt on the wheel, and the other extending transversely for receiving the other keeper ridge to engage and pull the belt.

22. The combination of claim 21 wherein each keeper is an injection molded one piece plastic member injection molded directly onto the band.

23. In a conveyor system of the type having a flexible endless belt entrained on at least a driving wheel and an idler wheel, the improvement wherein the driving wheel periphery is of a generally regular polygonal configuration having a plurality of generally flat faces and the endless belt includes a plurality of uniformly spaced apart relatively inflexible key segments each having an inner face conforming to the contour of one face of the polygonal driving wheel and an outer face adapted to releaseably receive components to be conveyed thereby, each key segment outer face including at least two flexible projections extending away from the belt in a spaced aligned relationship for resiliently gripping a component placed therebetween.

24. The improvement of claim 23 wherein each key segment has four flexible projections in pairwise alignment both longitudinally and transversely of the belt, each longitudinally aligned pair functioning to grip a component and with a gap between transverse pairs for facilitating component removal from the key segment.

* * * * *